March 27, 1945. J. S. JOHNSON Re. 22,624
FLOOR FURNACE
Original Filed Feb. 18, 1942 2 Sheets-Sheet 1
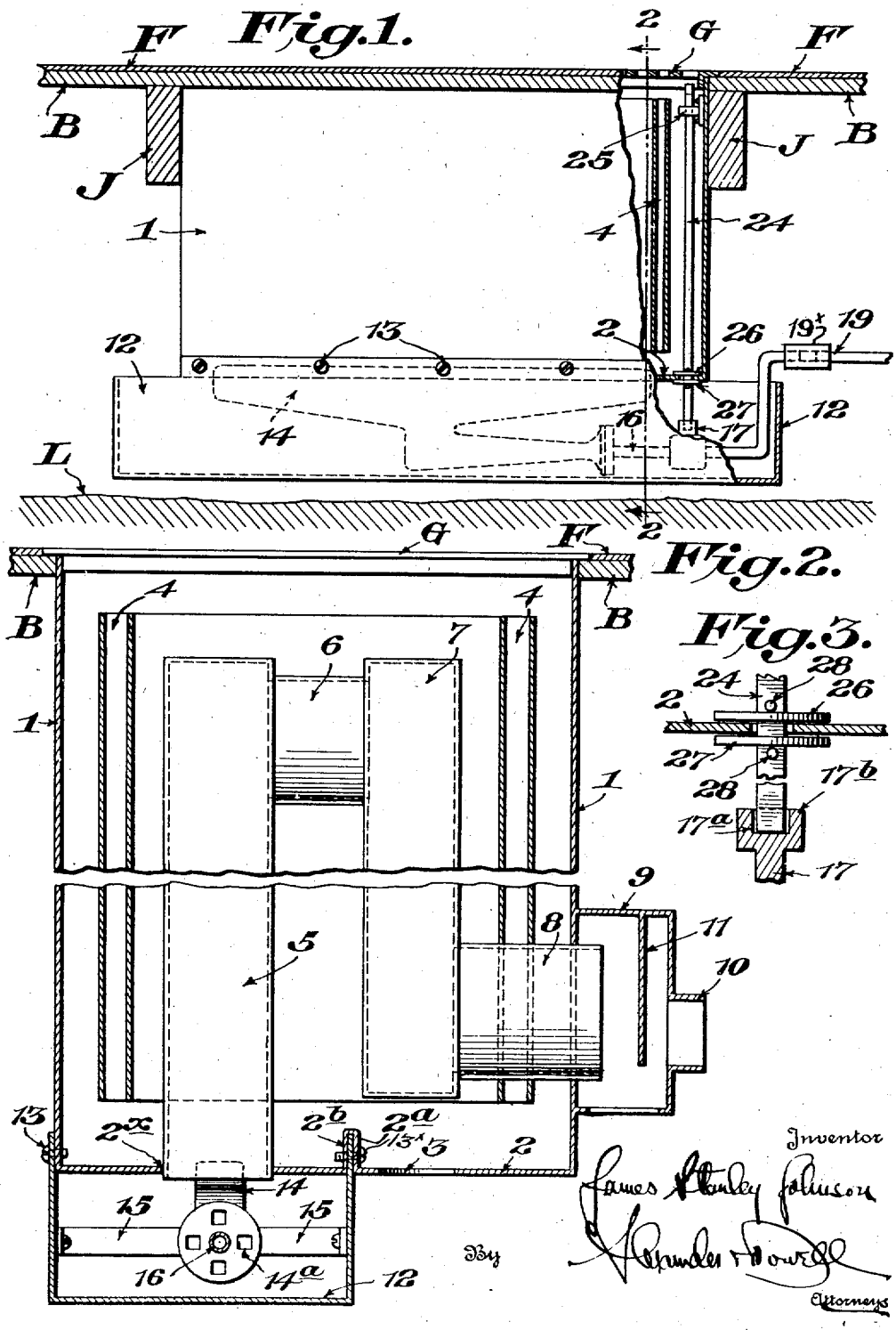

March 27, 1945. J. S. JOHNSON Re. 22,624

FLOOR FURNACE

Original Filed Feb. 18, 1942 2 Sheets-Sheet 2

Inventor

James Stanley Johnson

By

Attorneys

Reissued Mar. 27, 1945 Re. 22,624

UNITED STATES PATENT OFFICE 22,624

FLOOR FURNACE

James Stanley Johnson, Pasadena, Calif.

Original No. 2,335,678, dated November 30, 1943, Serial No. 431,437, February 18, 1942. Application for reissue November 20, 1944, Serial No. 564,263

38 Claims. (Cl. 126—116)

This invention is a novel improvement in floor furnaces particularly adapted for burning gaseous fuel, and adapted to be disposed beneath the finished ground floor of a dwelling or the like for the purpose of heating the interior of the dwelling.

Heretofore gas floor furnaces in small units, have been suspended from the finished ground floor, such furnaces usually extending 30 to 36 inches below the floor level, the bottom 4 to 6 inches being taken up by the burner, gas valves, and the shield around the burner. However, in places where floor furnaces are extensively used the distance from the finished floor level to the ground is generally only about 25 inches, and consequently it was necessary to dig a pit to accommodate the furnace. Floor furnace ordinances and good practice renders it necessary to make provision so that the vital parts of the furnace will not be flooded by a water level of 6 inches above ground. Hence such pits must necessarily be concrete lined, with the edges of the pit carried 6 inches above the ground level. It is not practicable to make a floor furnace sufficiently shallow that the vital parts, such as the burner and valves, would be disposed 6 inches above the ground level.

One object of my invention therefore is to provide a floor furnace which will dispense with the necessity of providing a concrete pit around the furnace, and which will not be flooded by a 6 inch depth of water above the ground, my burner being provided with a watertight pan at the bottom of the furnace, said pan preferably holding the gas burner and gas valves, although it is not essential that the gas control valves be positioned within the pan; and said pan being open at its top and being fastened to the bottom of the furnace casing, the pan being watertight below its upper edges keeping the ground surface water away from the burner.

A further object of my invention is to provide the floor furnace with a pan of the above type having extensions at its ends projecting beyond the sides of the main furnace casing, said extensions being open at the top permitting air, necessary to support combustion at the burner, to enter the pan and pass horizontally inwardly towards the burner at the center of the pan, said air entering at substantially the level of the bottom of the main furnace casing.

It is moreover necessary on occasion to have access to the burner and gas valves for servicing; but in order to maintain a maximum depth of the furnace, the burner and the pan bottom cannot be disposed much above the ground level, and hence it is usually impossible to drop the pan much below the burner in order to remove the pan.

A further object of my invention, therefore, is to assemble the pan and burner together, with the gas control valve preferably but not necessarily a part of the assembly, whereby the pan, gas burner and gas valves can all be removed from the furnace without having to drop or lower the pan more than a fraction of an inch.

Usually the gas control valves are operated by means of rods which extend up through the furnace casing to and adjacent the grill at the top of the furnace, said rods being operated by a hand key. These rods are normally attached in recessed fittings on the valve stem and held in place by set screws, and generally the valves cannot be lowered without lowering the rods unless the normal rod and valve securing means were disconnected. In order to remove the pan, burner and valve assembly it is necessary to disconnect the control rods from the valves, but normally this is difficult to do, it being necessary to reach in and remove a set screw or cotter pin holding the rods in the valve stems.

A still further object of my invention is to provide valve rods which are rotatably mounted in the furnace casing in the usual manner, but are prevented from vertical movement therein by novel means, the rods having non-circular heads at their lower ends entering into correspondingly shaped recesses in the valve stems of the valves which are mounted or carried in the removable pan, whereby the valve stems will disengage themselves from the rods when the pan is lowered without requiring any manipulation or disconnection of parts by the operator, and will automatically re-engage the rods when the pan is restored into place.

Other minor objects of the invention will be hereinafter set forth.

I will explain the invention with reference to the accompanying drawings, which illustrate one practical embodiment thereof to enable others familiar with the art to adopt and use the same; and will summarize in the claims, the novel features of construction, and novel combinations of parts, for which protection is desired.

In said drawings:

Fig. 1 is a side elevation, partly in section, showing my novel floor furnace positioned below the finished ground floor of a building or the like with the pan secured to the bottom of the furnace and disposed slightly above the ground surface; also showing the control rods for the gas valves which extend down into the pan.

Fig. 2 is an enlarged vertical transverse section on the line 2—2, Fig. 1.

Fig. 3 is an enlarged detail view showing the lower end of the control rod fitting into the socket in the valve stem in the normal position of the pan, and showing the means for vertically positioning the control rods in the furnace casing.

Figure 4:
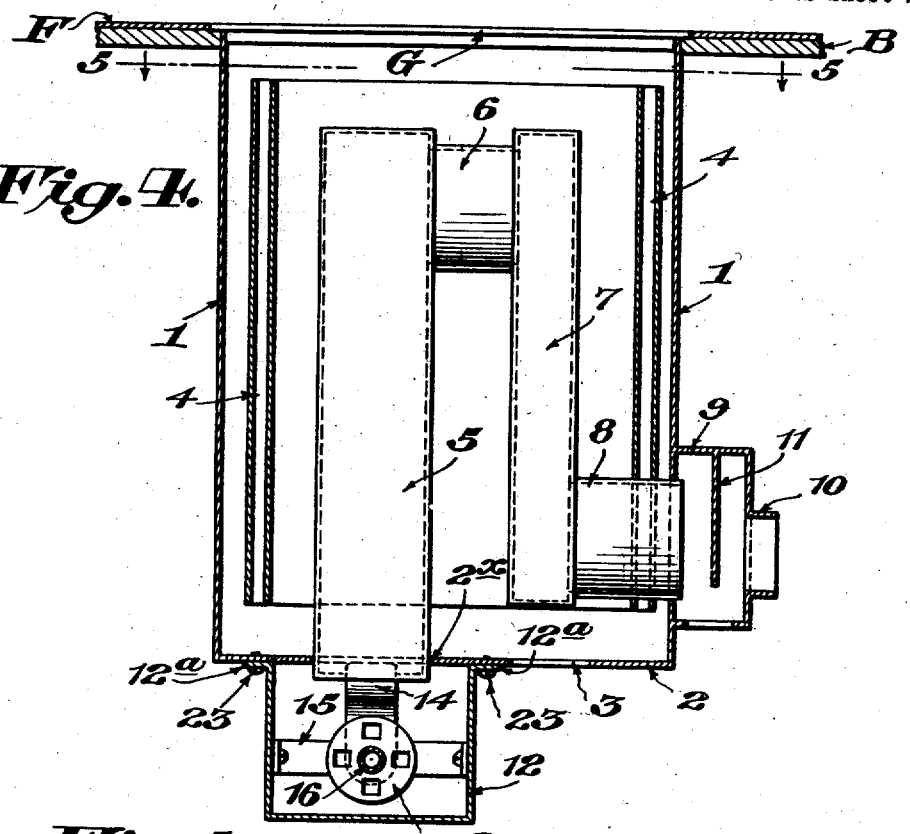
Fig. 4 is a transverse section similar to Fig. 2, but showing a modification.

As shown in Figs. 1 to 3, the floor furnace preferably comprises a casing 1 of rectangular plan and of such length that same will fit between adjacent joists J supporting the floor boards B of the ground floor of the building, which boards B may be covered with finishing flooring F of desired material in the usual manner. Casing 1 is open at the top, and at the upper end thereof is a grill G usually inserted flush with the surface of the flooring F. Usually the distance from a finished floor F to the ground level L (Fig. 1) is between 25 and 26 inches, and hence the casing 1 cannot exceed a depth of approximately 20 inches below the finished floor level in order that the pan 12, hereinafter described, may afford protection against water backed up to a depth of 6 inches above ground level L (Fig. 1), as the top of the watertight pan 12 would then be disposed 20 inches below the finished floor F. Moreover a 20 inch depth of casing is the minimum depth that will satisfy vent height requirements and will meet other requirements made by the American Gas Association.

The bottom of casing 1 is closed by a bottom plate 2 which as above stated may be disposed 20 inches from the open top of the casing. In the plate 2 extending adjacent to but spaced from one side wall thereof is a rectangular opening 2*x* down through which the lower end of a combustion chamber 5, hereinafter described, extends. As shown in Fig. 2 the bottom plate 2 is preferably provided with a longitudinally disposed upward flange 2*a* extending the full length of the bottom plate 2, said portion 2*a* being provided with a return downward flange 2*b*, the flanges 2*a*, 2*b* forming a downwardly opening slot in bottom plate 2 for the reception of the inner upper edge of the removable pan 12, hereinafter described held therein by means of bolts or screws 13*x*. Also, bottom plate 2 may be provided with one or more openings 3, which openings may, if desired, be covered with suitable screening or the like, for the purpose of admitting air into the bottom of the casing 1. However, the provision of the openings 3 is entirely optional.

Within casing 1, extending adjacent to the end and side walls thereof but spaced therefrom is a double-walled partition 4 open at the top and bottom, said partition forming a vertical passageway between the partition and walls of the casing for cool air entering from the edges of the grill G and passing downwardly of the casing to a point adjacent the lower end thereof, the air then passing inwardly of the casing 1, below the partition 4, and into the space around the combustion chamber 5 and flues, hereinafter described. Preferably the space between the double walls of the partition 4 is open at the top and bottom of the partition, as shown.

Figure 5:
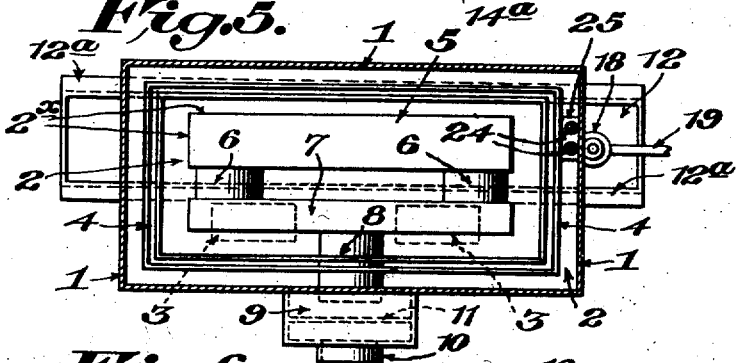
Fig. 5 is a reduced horizontal section on the line 5—5, Fig. 4.

Within casing 1, spaced from the double-walled partition 4, and extending downwardly a short distance through opening 2*x* in the bottom plate 2 of the casing, is a combustion chamber 5 closed at its top but open at its lower end, said casing 5 being relatively narrow and extending from a point adjacent one end of the partition to a point adjacent the other end thereof, as indicated in Fig. 5, the walls of the chamber at the side and upper edges being connected in a gastight manner so as to prevent the products of combustion from passing upwardly through the grill G and into the room being heated.

Adjacent the upper end of combustion chamber 5 at each side thereof are lateral flues 6 leading into a vertical flue 7 shaped similarly to combustion chamber 5 and disposed parallel therewith, said flue 7 being preferably but not necessarily of the same length but somewhat narrower and shallower than the combustion chamber 5, and flue 7 being closed in a gastight manner at its top, bottom, and side edges, the bottom of flue 7 terminating a short distance above the bottom plate 2 of casing 1.

Adjacent the bottom of flue 7 is a lateral flue 8, preferably disposed at the center of flue 7, flue 8 leading outwardly through the adjacent side wall of the casing in a gastight manner, as indicated in Fig. 2, to prevent the products of combustion passing through the flue 8 from returning along the exterior of flue 8 into the casing, which combustion products would then pass upwardly through grill G into the room being heated.

On the side of casing 1 around flue 8 is a housing 9 of general rectangular form, having an outlet 10 in its outer face. The bottom of housing 9 is open. Within housing 9 is a baffle 11 secured to the upper wall of housing 9, said housing and baffle forming a draft diverter to by-pass any draft coming down the vent due to wind, which draft would stop the flow of products of combustion in the furnace and cause smothering.

By the above construction, the combustion chamber 5 and the flues 6, 7, 8 are housed within a furnace casing having a 20 inch depth, and within the confines of the double-walled partition 4 which separates the cooler air passing downwardly adjacent the walls of casing 1 from the heated air passing upwardly around the combustion chamber and flues within the confines of partition 4 of the heater. The particular arrangement of the partition 4, the combustion chamber 5, and the flues 6, 7, 8, may however, be varied as desired.

Secured to the bottom of casing 1 is an elongated pan 12 of general rectangular form closed at its bottom but open at its top, said pan being watertight below its open upper end and being of length sufficient to extend beyond the ends of casing 1 as clearly indicated in Figs. 1 and 5. Pan 12 is of such width that one side wall may be secured directly to the adjacent outer side wall of the casing 1 by means of screws 13 or the like, while the other side wall of the pan will fit into the slot formed between flanges 2*a*, 2*b* of bottom plate 2 as clearly shown in Fig. 2, said side wall being maintained in said slot by means of bolts or screws 13*x*. The side walls of the pan may be 5 or 6 inches in height; and the pan 12 thus forms a watertight receptacle of substantial depth which is removably fitted to the bottom of the furnace casing.

The extending portions of pan 12 beyond the ends of the casing 1, being open at the top, permit air to enter through the open top adjacent the ends thereof and to pass inwardly in a horizontal direction to support combustion at the burner 14, hereinafter described, of the furnace contained in the pan 12 from whence the air and products of combustion pass upwardly into the open bottom of the combustion chamber 5, and through the flues 6, 7, 8 to heat the air around the combustion chamber 5 and flues 6, 7, 8, which heated air then rises upwardly and passes out through grill G into the room being heated.

Figure 6:
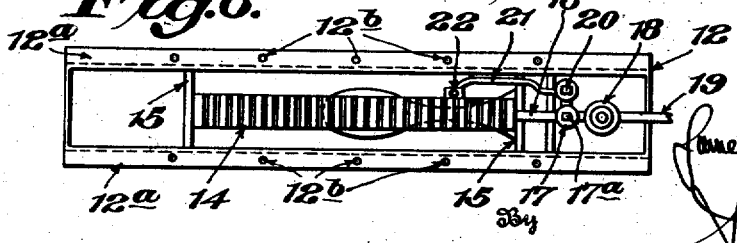
Fig. 6 is a plan view of the pan shown in Fig. 5, detached, but showing the burner, and the gas valves and gas pipe connections housed within the pan.

Within the pan 12 at the approximate center thereof is an elongated gas burner 14 (Fig. 6) secured therein by brackets 15, said burner having an air and gas mixing chamber 14a (Fig. 2) at one end into which enters a gas pipe 16, said chamber 14a having means whereby the percentage of air to be mixed with the gas may be adjusted in the usual manner. Gas burner 14 is substantially the same length as the open end of combustion chamber 5 and is provided in its upper face with a series of jets which enter the lower open end of combustion chamber 5.

In the gas pipe 16 is a main burner valve 17 (Figs. 1 and 6) which is connected by piping to a gas pressure regulator 18 and to a main gas intake pipe 19, which latter is connected to a suitable source of gas supply, the pipe 19 being preferably bent upwardly adjacent the end of the pan 12 and passing out of the open end thereof. Preferably the main gas pipe 19 is sufficiently flexible, or has a flexible section 19x or universal joint therein so that the pan 12 and its contents may be lowered from the casing 1, when the screws 13 and 13x are removed, sufficiently to permit repairs or servicing of the burner and the contents of the pan.

Connected by a by-pass to the main gas valve 17 is a pilot valve 20 disposed beside the valve 17, said valve 20 controlling the gas passing through pipe 21 to a pilot 22 disposed in the pan adjacent burner 14.

In the modification shown in Fig. 4, instead of using the pan connection disclosed in Fig. 2, a modified pan is used in which pan 12 is provided with lateral flanges 12a at its upper sides, said flanges having spaced series of holes 12b for screws 23 or the like which directly connect the flanges 12a to the underside of the furnace casing bottom 2, as shown in Fig. 4, thus dispensing with the necessity of having to provide the flanged portions 2a and 2b of the bottom plate 2 shown in Fig. 2.

In the modification shown in Fig. 4 the depth of the furnace casing 1 may also be limited to 20 inches, for the same reasons above stated in connection with the furnace shown in Figs. 1 and 2; and the bottom 2 of the furnace shown in Fig. 4 may similarly be provided with openings 3 which, if desired, may be covered with screening, and which admit additional fresh air into the bottom of furnace around the combustion chamber 5 and flues 6, 7, 8.

In both modifications, however, in order that pan 12 may be lowered without disturbing the control rods for the main gas valve 17 and pilot valve 20, the valves are preferably each provided with a non-circular recess 17a (Fig. 3) in its stem 17b, and extending downwardly through the casing 1 directly in alignment with the sockets 17a of the valves 17 and 20, are control rods 24 (Figs. 1 and 3) having their lower ends shaped to correspond with the non-circular sockets 17a, said sockets 17a being preferably of square shape.

Each rod 24 passes downwardly through openings therefor in the bottom plate 2 of the furnace between the adjacent end wall of the casing, and the double-walled partition 4, as indicated in Figs. 1 and 5, the upper ends of the rods passing through a guide bracket 25, and said rods having heads on their upper ends accessible through the grill G, whereby the rods 24 may be rotated by means of a suitable key (not shown).

The lower ends of rods 24 each carry a pair of spaced washers 26—27 (Figs. 1 and 3) which engage the upper and lower faces of the bottom plate 2 of the furnace around the openings, and are held in position by means of pins 28, which may be cotter pins or the like. Thus the rods 24 are rotatably mounted in the furnace casing but are prevented from vertical movement therein, and the lower non-circular ends thereof are each maintained in alignment with the non-circular sockets 17a in the stems 17b of valves 17 and 20 when the pan 12 is in normal position shown in Figs. 2 and 4.

By the above construction, when it is desired to service the members carried by the pan, the screws 13 and 13x or 23 may be readily removed and the pan dropped vertically a short distance so as to clear the lower end of the furnace casing and the pan swung laterally, the gas pipe 19 being sufficiently flexible or having a flexible section 19x to permit the pan to be swung laterally to give access to the contents of the pan. As soon as the servicing has been completed and the pan has been again positioned, elevated, and attached to the bottom of the casing by the screws 13 and 13x or 23, the lower ends of control rods 24 will be automatically engaged with the sockets 17a in the stems of the related valves 17 and 20, and thus the parts will be restored to normal operative position without necessitating further manipulation of parts.

By my construction the watertight pan 12 affords the desired protection against water of a depth of 6 inches above the ground level L; and my furnace is such that the top of the pan 12 extends to within 19 or 20 inches of the finished floor level F while providing for efficient combustion notwithstanding the limited space between the floor level and ground level.

I do not limit my invention to the exact forms shown in the drawings, for obviously changes may be made therein within the scope of the claims.

I claim:

1. In a floor furnace, a casing provided with an open top and having a bottom provided with an opening, a combustion chamber in the casing having an open lower end extending into and filling the opening in the casing bottom; a watertight pan below the casing bottom disposed across the opening therein; means for removably securing the pan to the casing; a gas burner mounted below the casing having jets normally entering the open lower end of the combustion chamber; said top of the burner being disposed at substantially the level of the upper edge of the pan; means for supplying gas to the burner; and means for admitting air into the pan at substantially the level of the top of the burner to support combustion.

2. In a furnace as set forth in claim 1, said pan being open at the top and having a portion extending beyond the casing, the extending portion forming the air admitting means.

3. In a furnace as set forth in claim 1, said pan being open at the top and having both ends extending beyond the casing, the extending ends forming the admitting means for air entering the pan from points outside the casing and passing inwardly of the pan toward the burner.

4. In a floor furnace, a casing provided with an open top and having a bottom provided with an opening, a combustion chamber in the casing having an open lower end extending into and fillig the opening in the casing bottom; a watertight pan below the casing bottom disposed across the opening therein; means for removably securing the pan to the casing; a gas burner mounted in said pan having jets normally entering the open bottom of the combustion chamber; means for supplying gas to the burner; and means for admitting air into the pan to support combustion.

5. In a furnace as set forth in claim 4, said gas supplying means comprising a pipe having a flexible joint so that when the pan securing means is detached the pan may be slightly lowered and swung laterally of the casing to give access to the burner.

6. In a furnace as set forth in claim 4, said pan being open at the top and having a portion extending beyond the casing, the extending portion forming the air admitting means.

7. In a furnace as set forth in claim 4, said pan being open at the top and having both ends extending beyond the edges of the casing, the extending ends forming the admitting means for air entering the pan from points outside the casing and passing inwardly of the pan towards the burner in a horizontal direction.

8. In a furnace as set forth in claim 4, said pan having portions of its upper edges overlapping portions of the casing bottom; and said pan securing means comprising removable members connecting the said upper edge portions of the pan with said overlapped portions of the casing bottom.

9. In a furnace as set forth in claim 4, said pan securing means comprising an inverted U-shaped flange forming a downwardly opening slot extending upwardly of the casing bottom adjacent to one side thereof, said slot receiving one side wall of the pan, the other side wall of the pan being secured to the side wall of the casing.

10. In a floor furnace, a casing provided with an open top and having a bottom provided with an opening, a combustion chamber in the casing having an open lower end extending into and filling the opening in the casing bottom; a pan below the casing bottom disposed normally across the opening therein; means for removably securing the pan to the casing; a gas burner mounted in said pan and having jets normally entering the open lower end of the combustion chamber; a valve mounted in the pan controlling the gas passing to the burner; a vertical control rod rotatably journaled in the casing and having its lower end normally seated in a socket in the stem of the valve; and means for preventing vertical movement of the rod, whereby when the pan is detached and lowered the rod will be disengaged from the valve socket, said rod and socket reengaging when the pan is restored to normal position.

11. In a furnace as set forth in claim 10, said pan being open at its top and having a portion extending beyond the casing to admit air into the pan to support combustion; and a gas supply pipe having a section entering the extended portion of the pan and connected with said valve, said supply pipe having a flexible joint whereby when the pan is detached the pan may be slightly lowered and swung laterally of the casing to give access to the burner.

12. In a furnace as set forth in claim 10, a pilot for said burner; a second valve mounted in the pan and disposed beside the first valve for controlling said pilot; and a second control rod for said second valve rotatably mounted in the casing beside the first control rod and adapted to normally enter a socket in the stem of the second valve when the pan is in normal position.

13. In a furnace as set forth in claim 10, said control rod passing downwardly through a hole in the bottom of the casing; and said means for preventing vertical movement of the rod comprising a pair of spaced members mounted on the rod and engaging opposite faces of the casing bottom.

14. In a furnace as set forth in claim 10, said control rod passing downwardly through a hole in the bottom of the casing; said means for preventing vertical movement of the rod comprising a pair of spaced members mounted on the rod and engaging opposite faces of the casing bottom; and a bearing adjacent the upper end of the casing in which said rod is rotatably mounted.

15. In a floor furnace, a casing provided with an open top and having a bottom provided with an opening; a combustion chamber in the casing having an open lower end extending into and filling the opening in the casing bottom; a watertight pan below the casing bottom normally disposed across the opening therein; means for removably securing the pan to the casing; a gas burner mounted in said pan and having jets normally entering the open bottom of the combustion chamber; and means for admitting air into the pan to support combustion; a valve mounted in the pan controlling the gas passing to the burner; a vertical control rod rotatably journaled in the casing and having its lower end normally seated in a socket in the stem of the valve; and means for preventing vertical movement of the rod, whereby when the pan is detached and lowered the rod will be disengaged from the valve socket, said rod and socket re-engaging when the pan is restored to normal position.

16. In a furnace as set forth in claim 15, said pan being open at its top and having one or both ends extending beyond the casing to admit air into the pan to support combustion at the burner; and a gas supply pipe having a section entering an extended end of the pan and connected with said valve, said supply pipe having a flexible joint whereby when the pan is detached the pan may be slightly lowered and swung laterally of the casing to give access to the burner.

17. In a furnace as set forth in claim 15, a pilot for said burner, a second valve mounted in the pan and disposed beside the first valve for controlling said pilot; and a second control rod for said second valve rotatably mounted in the casing beside the first control rod and adapted to normally enter a socket in the stem of the second valve when the pan is in normal position.

18. In a furnace as set forth in claim 15, said control rod passing downwardly through a hole in the bottom of the casing; said means for preventing vertical movement of the rod comprising a pair of spaced members mounted on the control rod and respectively engaging opposite faces of the casing bottom; and a bearing adjacent the upper end of the casing in which said rod is rotatably mounted.

19. In a furnace as set forth in claim 15, said pan having portions of its upper edges overlapping portions of the casing bottom; and said pan securing means comprising removable members connecting the said upper edge portion of the pan with said overlapped portions of the casing bottom.

20. In a furnace as set forth in claim 15, said pan securing means comprising an inverted U-shaped flange forming a downwardly opening slot extending upwardly of the casing bottom adjacent to one side thereof, said slot receiving one side wall of the pan, the other side wall of the pan being secured to the side wall of the casing.

21. In a floor furnace adapted to be mounted between a floor and the ground surface, comprising a casing provided with an open top and having a bottom provided with an opening; a combustion chamber in the casing having an open lower end extending into and closing the opening in the casing bottom; a gas burner mounted below the casing and having jets entering the open lower end of the combustion chamber; means for supplying gas to the burner; a watertight pan disposed above the ground level and having side walls extending up around the top of the burner, said side walls including wall portions extending beyond the casing to admit air to the burner to support combustion, and means for removably attaching said pan to said casing.

22. In a floor furnace as set forth in claim 21, said pan overlapping the lower portion of the casing.

23. In a floor furnace as set forth in claim 21, said pan overlapping the lower portion of the casing, said attaching means connecting the upper edges of the pan to the casing.

24. In a floor furnace adapted to be mounted between a floor and the ground surface, the combination of a casing provided with an open top; a combustion chamber in said casing; a gas burner having jets entering said combustion chamber; a watertight pan having an open upper end and having side walls extending up around said burner; and means suspending said pan above ground level, said means being releasable whereby said pan may be detached vertically with respect to said casing to a position permitting its removal laterally beyond said casing.

25. In a floor furnace adapted to be mounted between a floor and the ground surface, the combination of a casing provided with an open top; a combustion chamber in said casing; a gas burner having jets entering said combustion chamber; a watertight pan having an open upper end and having side walls extending up around said burner and wall portions extending beyond said casing to admit air to said burner to support combustion; and means so suspending said pan above ground level that said pan is detachable for vertical movement with respect to said casing to a position permitting its removal laterally beyond said casing.

26. In a floor furnace adapted to be mounted between a floor and the ground surface, the combination of a casing provided with an open top; a combustion chamber in said casing; a gas burner having jets entering said combustion chamber; a watertight pan having an open upper end and having side walls extending up around said burner and admitting air at substantially the level of said burner jets; and means adapted for so suspending said pan above ground level that said pan is detachable for vertical movement with respect to said casing to a position permitting its removal laterally beyond said casing.

27. In a floor furnace adapted to be mounted between a floor and the ground surface, the combination of a casing provided with an open top; a combustion chamber in said casing; a gas burner having jets entering said combustion chamber; a watertight pan having an open upper end and having walls extending up around said burner, one of said walls being spaced from said casing to admit air to said pan at substantially the level of said burner jets; and means so suspending said pan above ground level that said pan is detachable for vertical movement with respect to said casing to a position permitting its removal laterally beyond said casing.

28. In a floor furnace adapted to be mounted between a floor and the ground surface, the combination of a casing provided with an open top; a combustion chamber in said casing; a gas burner having jets entering said combustion chamber; a watertight pan having an open upper end and having side walls extending up around said burner; and means releasably connecting said pan to said casing so that said pan is normally positioned above ground level and so that said pan is vertically detachable from said casing to a position permitting its removal laterally beyond said casing.

29. In a floor furnace adapted to be mounted between a floor and the ground surface, the combination of a casing provided with an open top; a combustion chamber in said casing; a gas burner having jets entering said combustion chamber; a watertight pan having an open upper end and having walls extending up around said burner and wall portions extending beyond said casing to admit air to said pan at substantially the level of said burner jets; and means releasably connecting said pan to said casing.

30. In a floor furnace adapted to be mounted between a floor and the ground surface, the combination of a casing provided with an open top; a combination chamber in said casing; a gas burner having jets entering said combustion chamber; a watertight pan having an open upper end and having walls extending up around said burner; an means adapted for supporting said pan with its upper edge normally adjacent the lower end of said casing, said means being releasable for vertical movement of said pan with respect to said casing to a position permitting its removal laterally beyond said casing.

31. In a floor furnace adapted to be mounted between a floor and the ground surface, the combination of a casing provided with an open top; a combustion chamber in said casing; a gas burner having jets entering said combustion chamber; a watertight pan having an open upper end and having walls extending up around said burner and having wall portions extending beyond said casing to admit air to said burner to support combustion; and means releasably supporting said pan with its upper edge normally adjacent the lower end of said casing.

32. In a floor furnace adapted to be mounted between a floor and the ground surface, the combination of a casing provided with an open top; a combustion chamber in said casing; a gas burner having jets entering said combustion chamber; a watertight pan having an open upper end, the side walls of said pan being separated a distance less than the distance separating the side walls of said casing and one of the end walls of said pan being spaced from the corresponding end wall of said casing to admit air to said pan; and means for removably supporting said pan so that walls of said pan normally extend up around said burner.

33. In a floor furnace, the combination of a casing provided with an open top; a combustion chamber in said casing having an open lower end; a gas burner having jets normally entering said open lower end of said combustion chamber; a watertight pan having end walls and having side walls extending up around the sides of said burner; and means for admitting air into said pan at substantially the level of the top of said burner.

34. In a floor furnace, the combination of a casing provided with an open top; a combustion chamber in said casing having an open lower end; a gas burner having jets normally entering said open lower end of said combustion chamber; a watertight pan having watertight end walls and having water tight side walls extending up around the sides of said burner; and means for admitting air into said pan at substantially the level of the top of said burner, the top of said burner being disposed at substantially the level of the top of said pan.

35. In a floor furnace adapted to be mounted between a floor and the ground surface, the combination of a casing provided with an open top; a combustion chamber in said casing; a gas burner having jets entering said combustion chamber; a watertight pan having an open upper end, the side walls of said pan being separated a distance less than the distance separating the side walls of said casing and one of the end walls of said pan being spaced from the corresponding end wall of said casing to admit air to said pan; and means for removably supporting said pan so that said pan is normally above ground surface and so that walls of said pan normally extend up around said burner.

36. In a floor furnace adapted to be mounted between a floor and the ground surface, the combination of a casing provided with an open top; a combustion chamber in said casing; a gas burner having jets entering said combustion chamber; a watertight pan having an open upper end, the side walls of said pan being separated a distance less than the distance separating the side walls of said casing and one of the end walls of said pan being spaced from the corresponding end wall of said casing to admit air to said pan; and means for removably supporting said pan with its upper edge normally adjacent the lower end of said casing and so that walls of said pan normally extend up around said burner.

37. In a floor furnace adapted to be mounted between a floor and the ground surface, the combination of a casing provided with an open top; a combustion chamber in said casing; a gas burner having jets entering said combustion chamber; a watertight pan having an open upper end, the side walls of said pan being separated a distance less than the distance separating the side walls of said casing and one of the end walls of said pan being spaced from the corresponding end wall of said casing to admit air to said pan at substantially the level of the burner jets; and means for removably supporting said pan so that walls of said pan extend up around said burner.

38. In a floor furnace adapted to be mounted between a floor and the ground surface, the combination of a casing provided with an open top; a combustion chamber in said casing; a gas burner having jets entering said combustion chamber; a watertight pan having an open upper end, the side walls of said pan being separated a distance less than the distance separating the side walls of said casing and one of the end walls of said pan being spaced from the corresponding end wall of said casing to admit air to said pan; and means adapted for detachably connecting said pan to said casing so that walls of said pan extend up around said burner.

JAMES STANLEY JOHNSON.